US011920414B2

(12) United States Patent
McGuire

(10) Patent No.: US 11,920,414 B2
(45) Date of Patent: Mar. 5, 2024

(54) DOWNHOLE TURBINE FOR MANAGED PRESSURE DRILLING

(71) Applicant: Schlumberger Technology Corporation, Sugar Land, TX (US)

(72) Inventor: Stephen D. McGuire, Hockley, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 17/819,844

(22) Filed: Aug. 15, 2022

(65) Prior Publication Data

US 2023/0053504 A1 Feb. 23, 2023

Related U.S. Application Data

(60) Provisional application No. 63/235,869, filed on Aug. 23, 2021.

(51) Int. Cl.

| | |
|---|---|
| ***E21B 21/08*** | (2006.01) |
| ***E21B 41/00*** | (2006.01) |
| ***F03B 13/02*** | (2006.01) |

(52) U.S. Cl.

CPC .......... *E21B 21/08* (2013.01); *E21B 41/0085* (2013.01); *F03B 13/02* (2013.01)

(58) Field of Classification Search

CPC ....... E21B 21/08; E21B 41/0085; F03B 13/02

See application file for complete search history.

(56) References Cited

U.S. PATENT DOCUMENTS

| | | | | |
|---|---|---|---|---|
| 11,454,095 | B1 * | 9/2022 | Gajic | E21B 47/13 |
| 2003/0066650 | A1 * | 4/2003 | Fontana | E21B 21/085 166/358 |
| 2006/0245945 | A1 * | 11/2006 | Wilson | F04D 19/022 417/405 |
| 2015/0098794 | A1 * | 4/2015 | Baski | F04D 29/086 415/1 |
| 2017/0284219 | A1 * | 10/2017 | Hunter | F01D 17/146 |
| 2018/0038177 | A1 * | 2/2018 | Leuchtenberg | E21B 33/064 |
| 2021/0348508 | A1 * | 11/2021 | Greci | E21B 47/20 |

* cited by examiner

*Primary Examiner* — Brad Harcourt

(57) ABSTRACT

A mud turbine apparatus includes a rotor including an inner ring configured to be positioned around a drill pipe, an outer ring that is positioned around and spaced apart from the inner ring, a plurality of magnets coupled to the outer ring, and a plurality of blades coupled to and extending between the inner ring and the outer ring. The apparatus also includes a stator including a housing configured to fit into an annulus between the drill pipe and a surrounding tubular, and to receive the outer ring at least partially therein, and a plurality of coils that communicate with the magnets, such that in a first mode of operation, the rotor rotates to assist fluid flow therethrough and decrease drilling fluid pressure in the annulus, and in a second mode of operation, the rotation of the rotor impedes fluid flow therethrough and increases drilling fluid pressure in the annulus.

20 Claims, 4 Drawing Sheets

DOWNHOLE TURBINE FOR MANAGED PRESSURE DRILLING

CROSS-REFERENCE TO RELATED APPLICATION

This application claims the benefit of U.S. Provisional Patent Application No. 63/235,869, entitled "DOWNHOLE TURBINE FOR MANAGED PRESSURE DRILLING," filed Aug. 23, 2021, the disclosure of which is hereby incorporated herein by reference.

BACKGROUND

When drilling a wellbore, the pressure in the well is controlled to prevent ingress of fluids from the surrounding formation, and also to prevent migration of drilling mud into the formation. Traditionally, this has been accomplished by varying the density of the drilling fluid, which consequently varies the weight of the mud in the column formed by the well and, in offshore contexts, the riser, and thus the pressure in the well. More recently, managed pressure drilling has been employed, in which the drilling wellhead is not exposed to atmospheric pressure, but rather is sealed. A rotating control device (RCD) is provided, which grips the exterior of the drill pipe as it extends therethrough. Further, valves, chokes, mud-gas separators, etc., may be provided so as to adjust the pressure circulating in the well, e.g., without changing the density of the drilling mud.

One challenge encountered is that the RCD, generally an annular rubber element, may wear down during use, e.g., as drill pipe collars are passed through the RCD. Thus, the RCD may be replaced relatively frequently, e.g., after 100 hours of use. This can lead to non-productive rig time. Further, in offshore contexts, knowledge of the pressure in the well is useful, because problems, such as methane bubbling out of the mud, may be initiated in the riser, or even below, but may not be apparent to operators until the bubbles reach the surface. Thus, mitigation efforts often occur as a reaction to an on-going problem, rather than in advance thereof so as to avoid it.

SUMMARY

An apparatus is disclosed that includes a rotor including an inner ring configured to be positioned around a drill pipe, an outer ring that is positioned around and spaced apart from the inner ring, a plurality of magnets coupled to the outer ring, and a plurality of blades coupled to and extending between the inner ring and the outer ring. The apparatus also includes a stator including a housing configured to fit into an annulus between the drill pipe and a surrounding tubular, and to receive the outer ring at least partially therein, and a plurality of coils that communicate with the plurality of magnets, such that in a first mode of operation, the rotor rotates to assist fluid flow therethrough and decrease drilling fluid pressure in the annulus, and in a second mode of operation, the rotation of the rotor impedes fluid flow therethrough and increases drilling fluid pressure in the annulus.

A method is also disclosed. The method includes pumping a drilling fluid through a drill string and into an annulus, adjusting a pressure of the drilling fluid in the annulus by adjusting a rotational speed of a turbine in the annulus, measuring one or more properties of the drilling fluid in the annulus using a magneto hydrodynamic circuit of the mud turbine, and refining the pressure of the drilling fluid in the annulus using the magneto hydrodynamic circuit.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the embodiments described herein. However, it will be apparent to one of ordinary skill in the art that embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the techniques herein is for the purpose of describing particular embodiments only and is not intended to be limiting. As used in the description of the techniques herein and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1A:
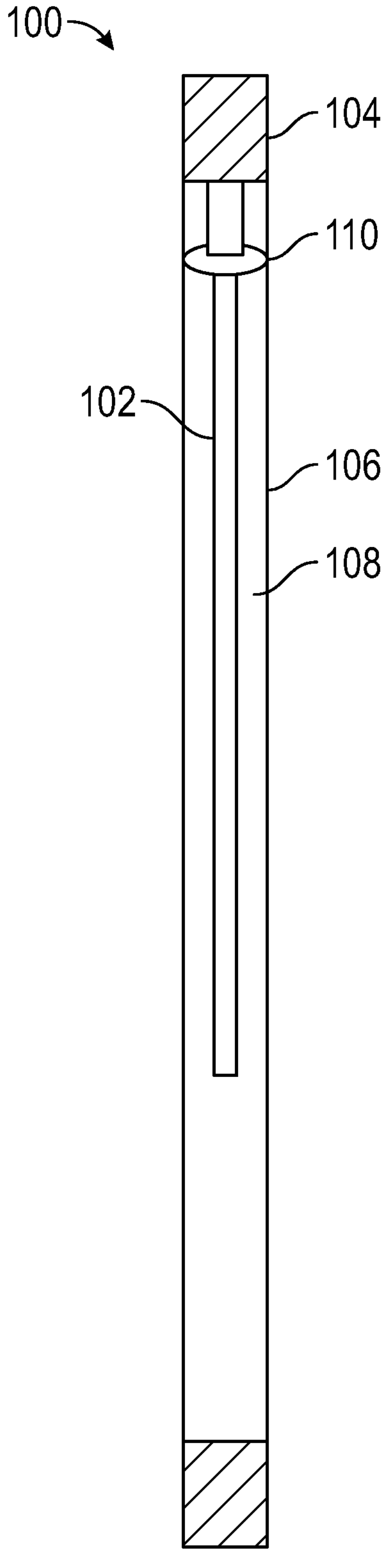
FIG. 1A illustrates a side, schematic view of a wellbore system that includes a mud turbine, according to an embodiment.

FIG. 1A illustrates a side, schematic view of a wellbore system 100, according to an embodiment. The wellbore system 100 may include a drill string 102 that extends downwards (or otherwise downhole), e.g., through a riser 104 and into a wellbore wall 106 (e.g., open hole, cased, etc.) that extends through a formation. An annulus 108 may be defined radially between the drill string 102 and the wellbore wall 106.

Figure 1B:
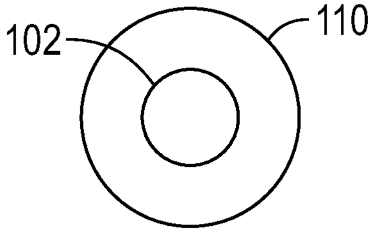
FIG. 1B illustrates a top view of the mud turbine in the wellbore system, according to an embodiment.
Figure 1C:
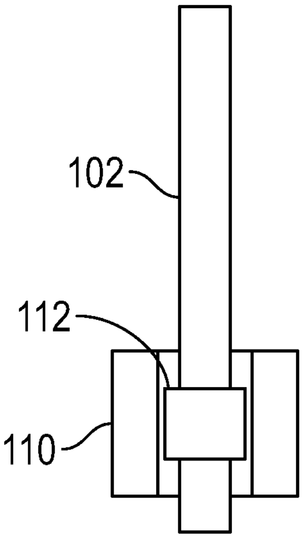
FIG. 1C illustrates a side view of the mud turbine receiving a drill pipe collar therethrough, according to an embodiment.

The wellbore system 100 may further include a mud turbine 110. The mud turbine 110 may be positioned around the drill string 102, e.g., in the annulus 108, as shown in FIG. 1B. Further, the mud turbine 110 may be sized to permit drill pipe collars 112 (or any other upset, shoulder, tool, etc.) to extend through the interior diameter of the mud turbine 110, as shown in FIG. 1C. The mud turbine 110 may be configured to adjust or otherwise control pressure in the annulus 108, and thus in the well, by adjusting a rotational speed of a rotor thereof and/or by adjusting a magneto hydrodynamic circuit thereof during mud flow, e.g., as part of managed pressure drilling. In some embodiments, this may permit a rotating control device at the wellhead to be omitted, although annular seals may still be employed. In some embodiments, the mud turbine 110 could be used along with a rotating control device.

Figure 2:
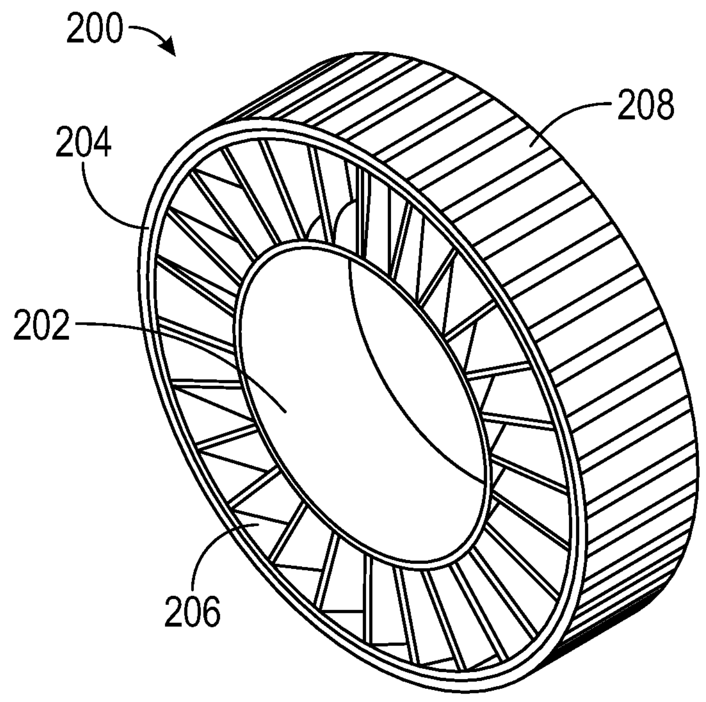
FIG. 2 illustrates a perspective view of a rotor of the mud turbine, according to an embodiment.

FIG. 2 illustrates a perspective view of a rotor 200 of the mud turbine 110. As shown, the rotor 200 includes an inner ring 202, which may be sized and configured to receive the drill string 102 (FIG. 1A) therethrough. Further, the rotor 200 may include an outer ring 204 positioned around and spaced radially outward from the inner ring 202. A plurality of blades 206 may be connected to the inner and outer rings 202, 204 and may extend therebetween and be connected thereto. Further, the blades 206 may be oriented/pitched at an angle configured to promote or impede fluid flow in one or both axial directions, e.g., depending on the rotational speed of the rotor 200 relative to the fluid flow rate.

The outer ring 204 may, for example, include a plurality of permanent magnets 208 coupled thereto, for example, received into slots formed in the outer diameter surface of the outer ring 204. The number of permanent magnets 208 employed may vary between implementations. As will be appreciated by one of skill in the art, the greater number of magnets may imply a greater number of poles, which may permit for the rotational speed of the rotor 200 to be relatively low. For example, 10, 20, 30, 40, 50, or more magnets 208 may be employed. This may permit designs that avoid use of a gear reduction device, while still permitting the rotor 200 to rotate the blades 206 at relatively slow speeds, e.g., on the order of 60 revolutions per minute, although many other speeds are contemplated.

Figure 3:
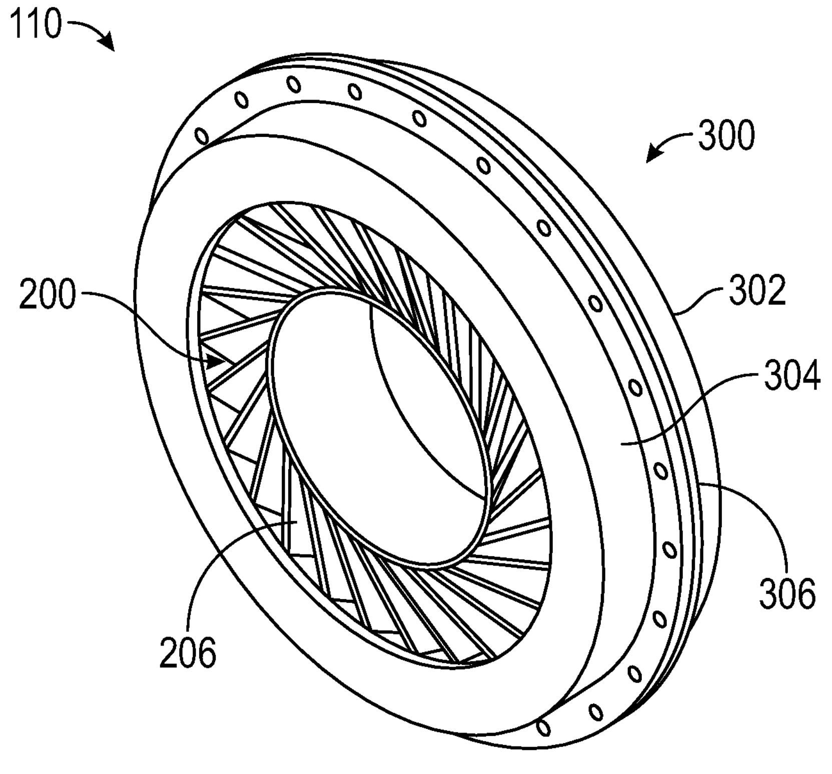
FIG. 3 illustrates a perspective view of the mud turbine, including the rotor and a stator, according to an embodiment.
Figure 4:
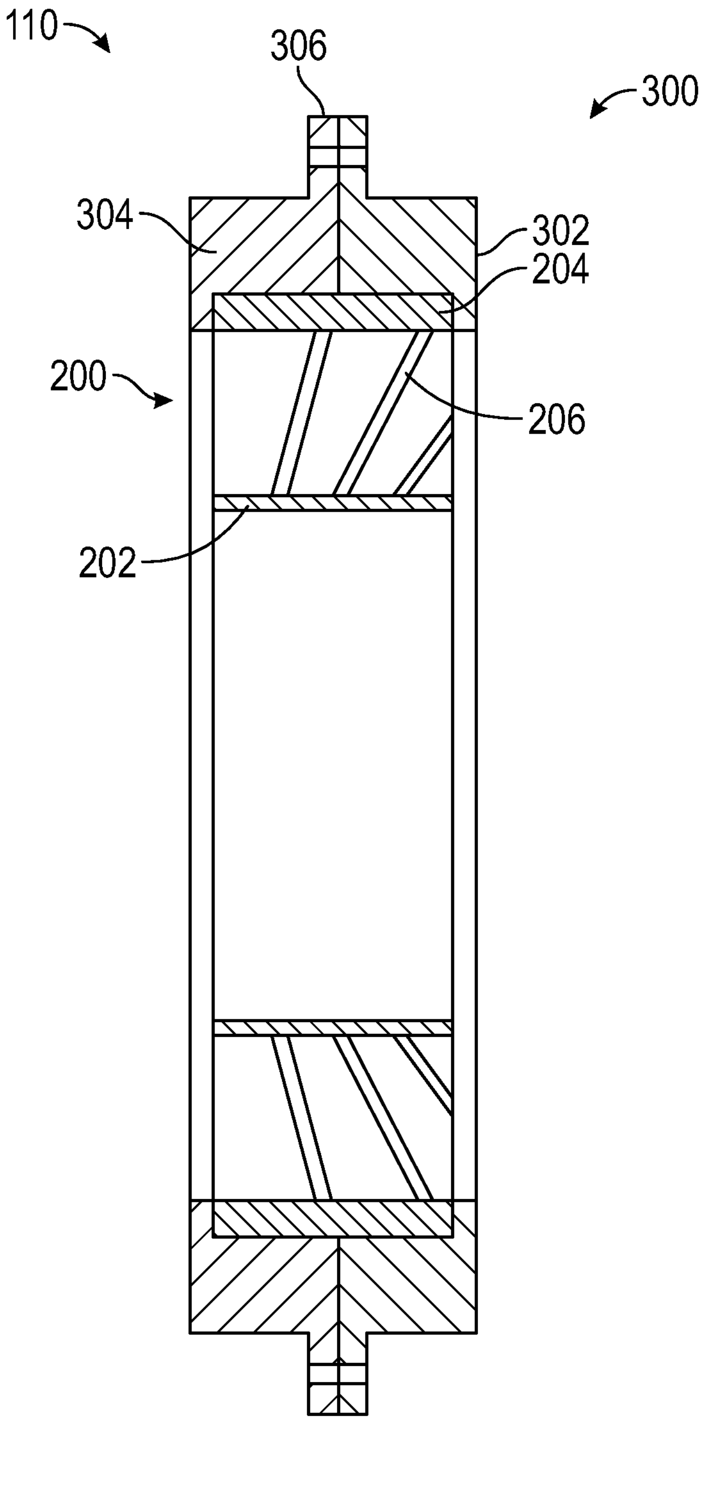
FIG. 4 illustrates a side, cross-sectional view of the mud turbine, according to an embodiment.

FIG. 3 illustrates a perspective view of the mud turbine 110, showing the rotor 200 received within a stator 300. FIG. 4 illustrates a side, cross-sectional view of the mud turbine 110, according to an embodiment. Referring to FIGS. 3 and 4, the stator 300 may have a housing or "shell" that extends around the outside of the rotor 200. The stator 300 may be coupled to or form part of the wellbore wall 106, or may otherwise be prevented from movement relative thereto. In a specific embodiment, as shown, the stator 300 may include two ring-shaped portions 302, 304, which are connected together at their middle at a flange connection 306. Further, the ring-shaped portions 302, 304 may leave a channel open therethough, which permits fluid flow across the blades 206 of the rotor 200.

Further, the stator 300 may include a plurality of coils therein, which form electromagnets that interact with the magnets 208 (FIG. 2) of the rotor 200 when energized. Accordingly, the stator 300 may be connected to a power source, e.g., a variable frequency drive, such that the power source drives the rotor 200 to rotate relative to the stator 300. In other embodiments, other types of electrical components may be employed to vary the power in the coils, such as inverters, IGBT transistors, etc.

In at least some embodiments, the mud turbine 110 may include a magneto hydrodynamic circuit. For example, the inner and outer rings 202, 204 of the rotor 200 may be coupled to a DC power source, such that one of the inner and outer rings 202, 204 serves as an anode wall and the other serves as a cathode wall. The blades 206 may be formed as electric insulators, and thus a magnetic field may be generated by application of the DC source to the inner and outer rings 202, 204. Lorentz forces are thus generated in the mud turbine 110 and may be incident upon the fluid flowing through the rotor 200. The polarity of the DC power may be switched, such that the DC power source is capable of selectively assisting or impeding fluid flow through the mud turbine 110. Additionally, the current provided by the DC power source may be modulated, so as to provide a range of forces to assist and/or impede fluid flow through the mud turbine 110.

Figure 5:
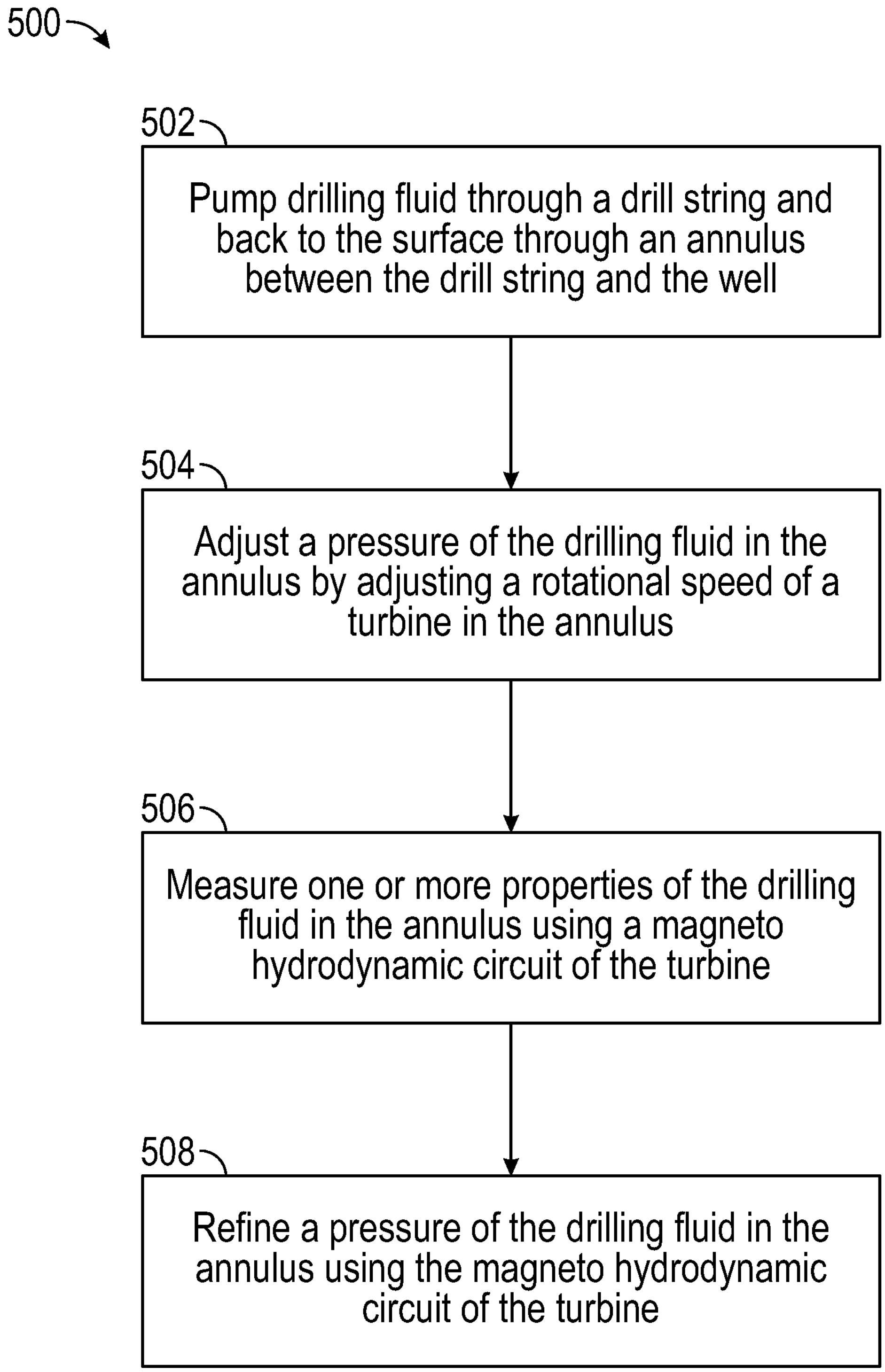
FIG. 5 illustrates a flowchart of a method for controlling pressure of a drilling fluid in an annulus of a well, according to an embodiment.

FIG. 5 illustrates a flowchart of a method 500 for controlling a pressure of a drilling fluid in an annulus 108 of a well using a mud turbine 110, according to an embodiment. In this embodiment, the method 500 may include pumping drilling fluid (mud) from the surface, through a drill string 102 and back to the surface at least partially via an annulus 108 formed between the drill string 102 and the wellbore wall 106, as at 502. A subsea riser 104 may also extend between the surface and the wellbore wall 106, as discussed above.

The method 500 may further include adjusting a pressure of the drilling fluid in the annulus 108 by adjusting a rotational speed of the turbine 110 in the annulus 108, as at 504. For example, a variable frequency drive may be coupled to coils of the mud turbine 110, such that the power is controllable so as to vary the rotational speed of the rotor 200 of the mud turbine 110. Since the rotor 200 includes the blades 202, the result may be that the rotor 200 increases pressure in the annulus 108 by rotating slower than the drilling fluid flow, such that a pressure builds up below the blades 208 as the fluid travels up the annulus 108. For example, a load may be applied to the rotor 200, such that the mud turbine 110 acts as a generator, producing a resistance to fluid flow that increases pressure in the drilling fluid. The rotor 200 may further be powered to rotate so as to decrease or increase the pressure in the drilling fluid below the blades 208. Accordingly, rotational speed of the mud turbine 110 may be employed to control the pressure of the fluid in the annulus 108 and thus in contact with the wellbore wall 106.

In other words, in some embodiments, for example, the mud turbine 110 may include at least a first mode of operation and a second mode of operation. In the first mode of operation, the blades 208 may be powered to rotate via the VFD or otherwise configured not to impede, or may even be configured to assist fluid flow, therethrough. Thus, in the first mode, the operation of the mud turbine 110 may induce relatively little, no, or even negative pressure increases in the drilling fluid in the annulus 108 below the mud turbine 110. In a second mode of operation, the mud turbine 110 may act as a generator, such that a controlled load produced by the coils and the magnets 208 is overcome by the energy of the fluid to rotate the rotor 200. Accordingly, in the second mode, the mud turbine 110 may increase pressure in the drilling fluid in the annulus 108 below the mud turbine 110.

The method 500 may also include sensing fluid characteristics using the mud turbine 110, as at 506. For example, the mud turbine 110 may provide the magneto hydrodynamic (MHD) circuit discussed above. The MHD circuit may, in some cases, provide measurements of conductivity/resistivity of the fluid. For example, at low pressures, gas may bubble out of solution in the drilling fluid. The bubbles of gas may have a higher electrical resistance than the drilling fluid. Thus, the MHD circuit, which includes the fluid as it flows through the turbine 110, may be able to sense when the pressure is too low, e.g., gas bubbles are forming. Thus, rather than recognizing such a condition when the bubbles reach the surface, above the riser 104, the method 500 may permit an early detection of such conditions and permit for proactive remediation measures (e.g., modulating control valves, changing pressure by changing the speed of the mud turbine 110, etc.).

In at least some embodiments, a further adjustment to fluid pressure is also provided via the MHD circuit, as at 508. Thus, while bulk changes in pressure in the drilling fluid may be generated by changing rotational speed, relatively small or "trim" changes may be produced by changing the current provided to the MHD circuit, e.g., to assist fluid flow more or less, or oppose fluid flow. For example, the MHD circuit may provide relatively low or zero inertia for such changes, allowing for rapid implementation and variation, relative to the higher inertia (but greater range of operating pressures) in the rotor 200/stator 300 combination.

In some embodiments, a rotary control device or subsea annular can be closed when a prolonged period of zero circulation of drilling fluid is expected. This may allow for trapping a desired pressure, without continued operation of the mud turbine 110, which may avoid heating the drilling fluid. Further, it will be appreciated that, although a single stage mud turbine 110 is discussed above, any number of two or more stages (e.g., rotor/stators) may be employed.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to explain at least some of the principals of the disclosure and their practical applications, to thereby enable others skilled in the art to utilize the disclosed methods and systems and various embodiments with various modifications as are suited to the particular use contemplated.

What is claimed is:

1. An apparatus, comprising:
- a rotor including:
  - an inner ring configured to be positioned around a drill pipe;
  - an outer ring that is positioned around and spaced apart from the inner ring;
  - a plurality of magnets coupled to the outer ring; and
  - a plurality of blades coupled to and extending between the inner ring and the outer ring; and
- a stator including:
  - a housing configured to fit into an annulus between the drill pipe and a surrounding tubular, and to receive the outer ring at least partially therein; and
  - a plurality of coils that communicate with the plurality of magnets, such that in a first mode of operation, the rotor rotates the plurality of blades independently from the drill pipe to assist a fluid flow therethrough and decrease a drilling fluid pressure in the annulus, and in a second mode of operation, the rotor rotates the plurality of blades independently from the drill pipe to impede the fluid flow therethrough and increase the drilling fluid pressure in the annulus, wherein the fluid flow is in a common direction through the rotor between the plurality of blades in the first and second modes of operation; and
- wherein the apparatus is configured to adjust a rotational speed of the rotor between the first and second modes of operation based on at least one property of the fluid flow, wherein the at least one property comprises a resistivity or a conductivity of the fluid flow.

2. The apparatus of claim 1, comprising a magneto hydrodynamic circuit configured to sense the resistivity or the conductivity of the fluid flow.

3. The apparatus of claim 2, wherein the magneto hydrodynamic circuit is configured to sense the resistivity or the conductivity of the fluid flow passing through the rotor, and to communicate data representing the resistivity or the conductivity to a controller.

4. The apparatus of claim 2, wherein the magneto hydrodynamic circuit comprises one of the inner and outer rings as an anode ring and another of the inner and outer rings as a cathode ring, and a magnetic field is generated by application of a power source to the anode and cathode rings.

5. The apparatus of claim 4, wherein the power source is configured to modulate a current to vary an electromagnetic force incident upon the fluid flow through the rotor, and the electromagnetic force is variable between a first electromagnetic force to assist the fluid flow and a second electromagnetic force to impede the fluid flow.

6. The apparatus of claim 1, wherein the plurality of blades are oriented at an angle configured to assist or impede the fluid flow depending on the rotational speed of the rotor.

7. The apparatus of claim 1, comprising a magneto hydrodynamic circuit configured to adjust an electromagnetic force on the fluid flow, wherein the magneto hydrodynamic circuit is configured to vary the electromagnetic force between a first electromagnetic force to assist the fluid flow and a second electromagnetic force to impede the fluid flow.

8. The apparatus of claim 7, wherein the magneto hydrodynamic circuit is formed into the inner and outer rings of the rotor.

9. A method, comprising:
- pumping drilling fluid from a surface, through a drill string, into an annulus formed between the drill string and a wellbore, and back to the surface;
- measuring at least one property of the drilling fluid, wherein the at least one property comprises a resistivity or a conductivity of the drilling fluid;
- adjusting, based on the at least one property, a pressure of the drilling fluid in the annulus by adjusting a rotational speed of a turbine having a plurality of blades extending at least partially radially through the annulus, wherein adjusting the pressure comprises:

decreasing the pressure in a first mode of operation by rotating the turbine independently from the drill string to assist a flow of the drilling fluid through the turbine; and increasing the pressure in a second mode of operation by rotating the turbine independently from the drill string to impede the flow of the drilling fluid through the turbine, wherein the flow of the drilling fluid is in a common direction through the turbine in the first and second modes of operation; and adjusting, based on the at least one property, the pressure of the drilling fluid in the annulus by adjusting an electromagnetic force on the flow of the drilling fluid through the turbine via a magneto hydrodynamic circuit, wherein the magneto hydrodynamic circuit is configured to switch between a first electromagnetic force to assist the flow of the drilling fluid through the turbine and a second electromagnetic force to impede the flow of the drilling fluid through the turbine.

10. The method of claim 9, wherein increasing the pressure comprises reducing the rotational speed of the turbine to impede the flow of the drilling fluid in the second mode of operation.

11. The method of claim 9, wherein decreasing the pressure comprises increasing the rotational speed of the turbine to assist the flow of the drilling fluid in the first mode of operation.

12. The method of claim 9, wherein measuring the at least one property comprises sensing the at least one property with the magneto hydrodynamic circuit of the turbine, the magneto hydrodynamic circuit comprising an anode ring and a cathode ring coupled to a power source, and the plurality of blades couple to and extend between the anode ring and the cathode ring.

13. The method of claim 12, wherein the at least one property comprises the resistivity.

14. The method of claim 12, wherein the at least one property comprises the conductivity.

15. The method of claim 9, wherein measuring the at least one property comprises measuring the resistivity or the conductivity to sense bubbles in the drilling fluid.

16. The method of claim 9, wherein the magneto hydrodynamic circuit is configured to switch between the first and second electromagnetic forces by changing a polarity of a power source of the magneto hydrodynamic circuit.

17. A method, comprising:

pumping a drilling fluid from a surface, through a drill string, into an annulus formed between the drill string and a wellbore, and back to the surface;

adjusting a pressure of the drilling fluid in the annulus by adjusting a rotational speed of a mud turbine in the annulus, wherein the mud turbine is configured to rotate independently from the drill string;

measuring one or more properties of the drilling fluid in the annulus using a magneto hydrodynamic circuit of the mud turbine, wherein the one or more properties comprises a resistivity or a conductivity of the drilling fluid, and the magneto hydrodynamic circuit is partially formed by the drilling fluid in the mud turbine; and refining the pressure of the drilling fluid in the annulus using the magneto hydrodynamic circuit to apply an electromagnetic force on the drilling fluid in the mud turbine, wherein the magneto hydrodynamic circuit is configured to vary the electromagnetic force to selectively assist a flow of the drilling fluid through the mud turbine and impede the flow of the drilling fluid through the mud turbine.

18. The method of claim 17, wherein adjusting the pressure comprises:

decreasing the pressure in a first mode of operation by rotating the mud turbine independently from the drill string to assist the flow of the drilling fluid through the mud turbine; and increasing the pressure in a second mode of operation by rotating the turbine independently from the drill string to impede the flow of the drilling fluid through the mud turbine, wherein the flow of the drilling fluid is in a common direction through the mud turbine in the first and second modes of operation.

19. The method of claim 17, wherein measuring one or more properties comprises measuring the resistivity or the conductivity to sense bubbles in the drilling fluid.

20. The method of claim 17, wherein refining the pressure comprises changing a polarity of a power source of the magneto hydrodynamic circuit to vary the electromagnetic force between a first electromagnetic force to assist the flow of the drilling fluid and a second electromagnetic force to impede the flow of the drilling fluid.

* * * * *